Jan. 8, 1952
H. E. HULL
2,581,415
SAW-SETTING MACHINE
Filed July 19, 1949
7 Sheets-Sheet 1
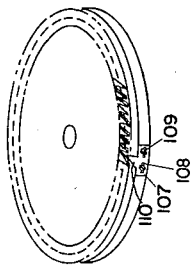
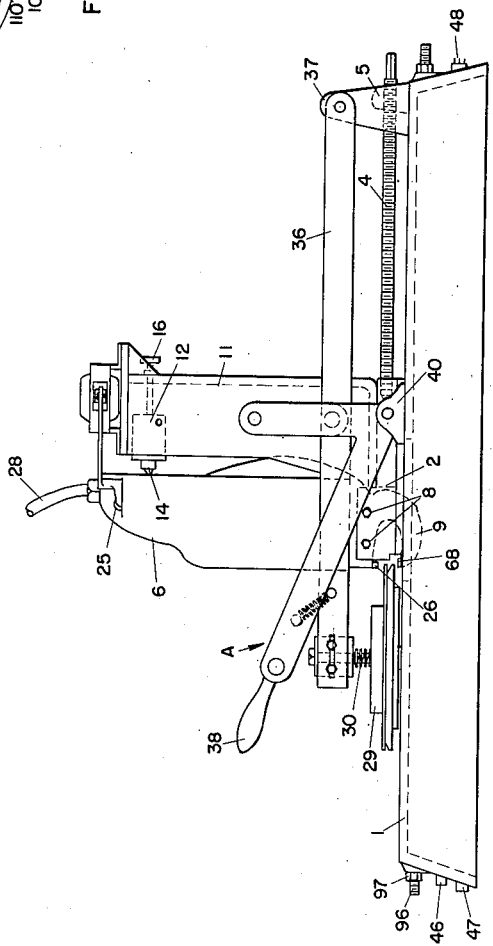
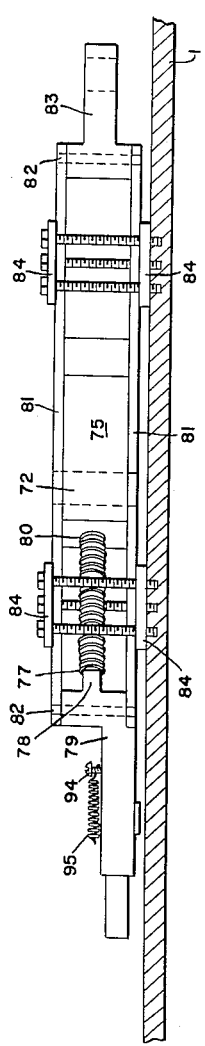
INVENTOR.
Henry E. Hull
BY
AGENTS Jan. 8, 1952        H. E. HULL        2,581,415

SAW-SETTING MACHINE

Filed July 19, 1949        7 Sheets-Sheet 2

*INVENTOR.*
Henry E. Hull

BY

*AGENTS*

Jan. 8, 1952     H. E. HULL     2,581,415
SAW-SETTING MACHINE

Filed July 19, 1949     7 Sheets-Sheet 3

*INVENTOR.*
Henry E. Hull

BY

*AGENTS*

Jan. 8, 1952  H. E. HULL  2,581,415
SAW-SETTING MACHINE

Filed July 19, 1949                                      7 Sheets-Sheet 4

INVENTOR.
Henry E. Hull
BY
*Adams, Stevens & Mase*
AGENTS

Jan. 8, 1952  H. E. HULL  2,581,415
SAW-SETTING MACHINE
Filed July 19, 1949  7 Sheets—Sheet 5

INVENTOR.
Henry E. Hull
BY
Adams, Stevens + Morse
AGENTS

Jan. 8, 1952     H. E. HULL     2,581,415
SAW-SETTING MACHINE
Filed July 19, 1949     7 Sheets-Sheet 6
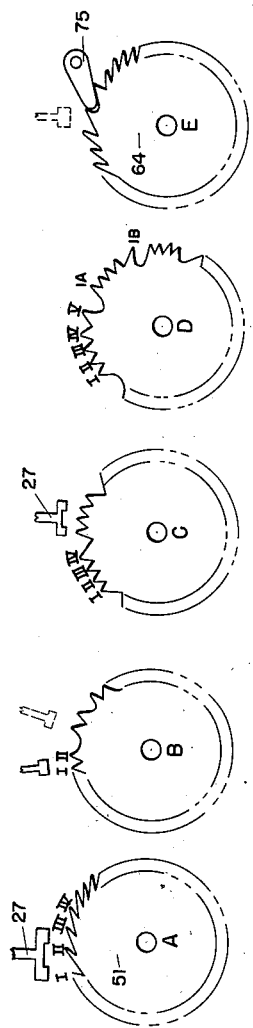
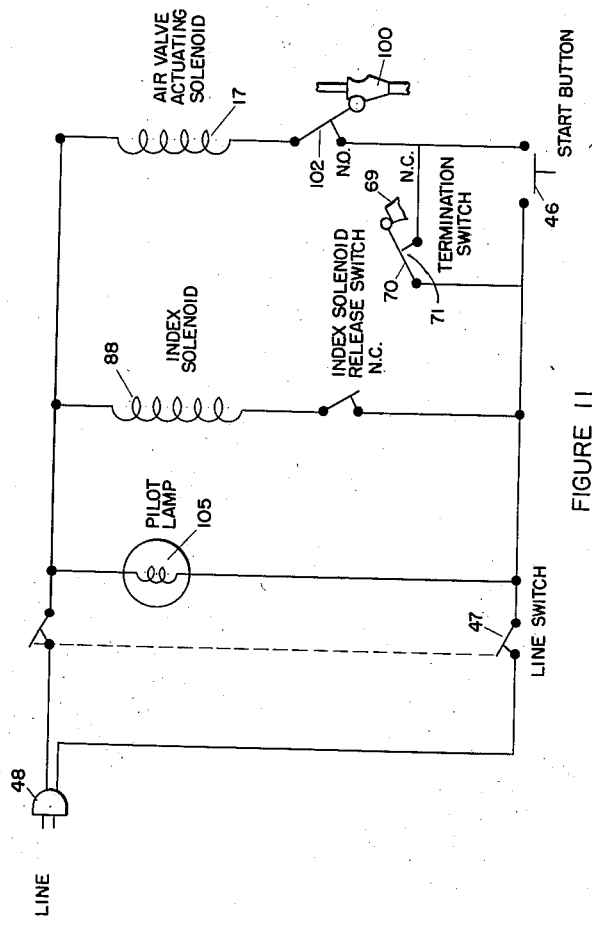
*INVENTOR.*
Henry E. Hull
BY
*AGENTS*

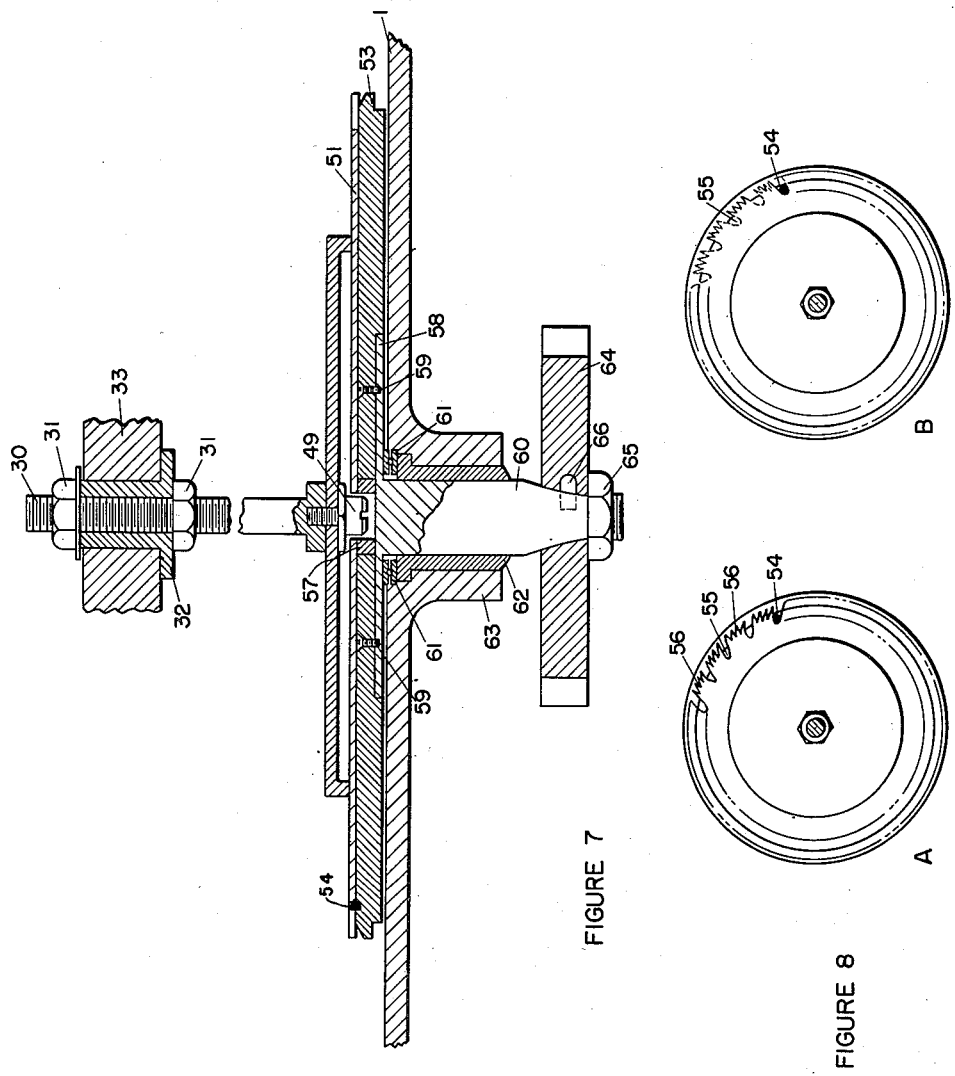

Patented Jan. 8, 1952

2,581,415

UNITED STATES PATENT OFFICE 2,581,415

SAW-SETTING MACHINE

Henry E. Hull, Worthington, Ohio, assignor, by mesne assignments, to Ohlen-Bishop Manufacturing Company, Columbus, Ohio, a corporation of Ohio Application July 19, 1949, Serial No. 105,560

9 Claims. (Cl. 76—58)

This invention relates to saw-setting machines. More particularly, this invention relates to a machine which will automatically set the teeth of circular saw blades.

Heretofore, saw teeth have been laboriously set manually in step-by-step successive operations requiring a great deal of time and attention by the worker. After mounting the saw blade in a holder, the usual method of setting teeth is to manually move the saw blade tooth-by-tooth past a beveled anvil. When the tooth stops, the operator strikes the tooth with a hammer to bend it against the anvil. When the proper set has thus been given to the tooth, another tooth is moved into position and the process repeated over and over again until the required number of teeth in the saw blade have been set in one direction. Hence, it would be highly desirable to provide a machine which would automatically and successively set the required number of teeth of a circular saw in the right direction eliminating the slow and uneconomic hand operations.

It is, therefore, an object of this invention to provide an automatic saw-setting machine.

It is another object of this invention to provide a machine which will automatically and successively set the teeth of a saw.

It is a further object of this invention to provide a machine which will automatically and successively index and set the teeth of a circular saw-blade in the proper direction.

These and other objects and advantages of the invention not specifically set forth will become more apparent when taken in conjunction with the accompanying drawings.

Figure 1 is a side-elevational view of the saw-setting machine showing its general appearance.

Figure 6 is a schematic representation of the method of setting teeth on four representative types of circular saw blades and an index ratchet plate for cooperation therewith.

Figure 7 is a vertical cross-sectional view of the anvil-bearing-index pawl plate assembly, showing the preferred clamp plate.

Figure 8 is a plan view of a saw blade secured by a pin to the anvil for rotative movement in one direction.

Figure 9 is a side-elevational, partly sectional, view of the pawl-slider assembly.

Figure 10 is a view of an adjustable catch to secure the circular saw blade to the anvil plate.

Figure 11 is a wiring diagram for the operation and control of the saw-setting machine.

Figure 12 is a vertical sectional view of a modified crosshead-clamp plate assembly.

Figure 2:
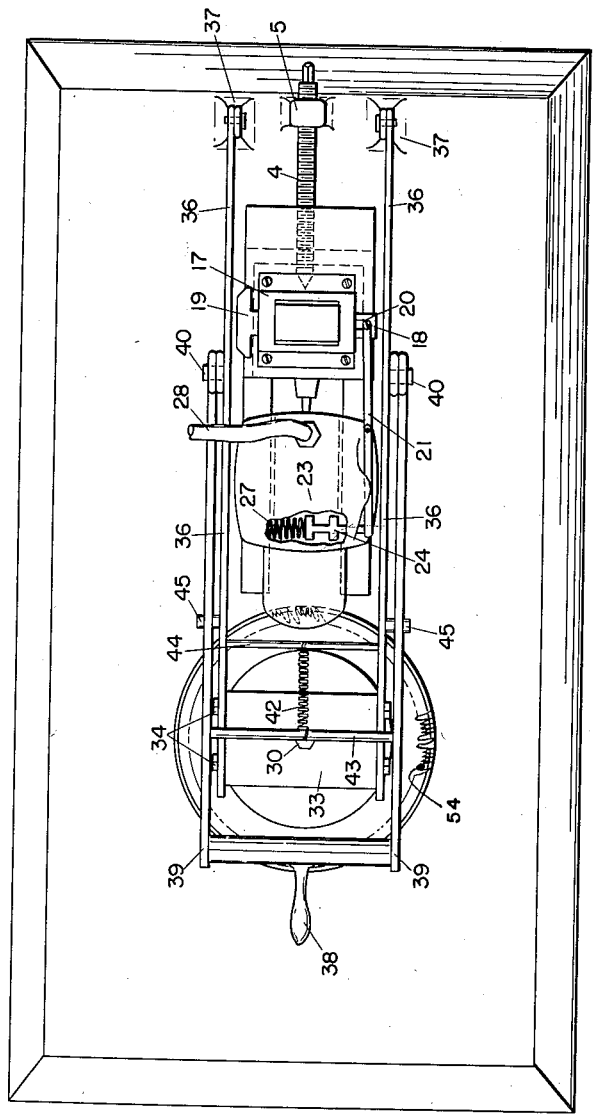
Figure 2 is a plan view of the saw-setting machine.
Figure 3:
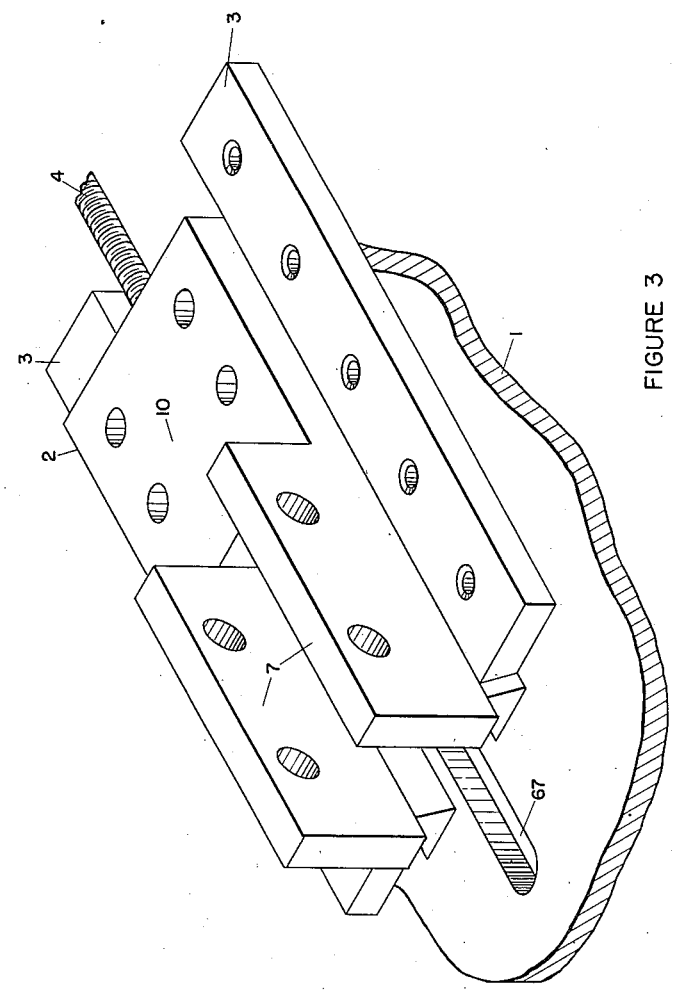
Figure 3 is a perspective view of the block, and guides therefor, on which is mounted the air motor and the frame.

The new and novel machine shown in the drawings renders the saw-tooth setting operation for circular saw blades a completely automatic and mechanical one. This machine will automatically and successively set the required number of teeth in the right direction, giving each saw tooth the amount and degree of angle desired. It will set all the teeth in the periphery of the circular saw blade, or every other tooth, or any predetermined combination of teeth, and will accommodate circular saw blades of many different types, i. e., rip, cut-off, mitre, combination, etc. The machine is, furthermore, adjustable so that it will take circular saw blades of any size or range of diameter or thickness.

The various elements of the saw-setting machine and their mode of operation will now be described in more detail.

In Figures 1, 2, 3, 4 and 7 of the drawings, 1 designates the inverted box-like base on which is mounted the saw-setting mechanism with its cooperating indexing mechanism. On the upper surface of the base block 2 is placed in parallel guides 3—3 secured to the base and on turning lead screw 4 in boss 5 the block is caused to reciprocate horizontally in the grooves toward or away from the work. A conventional squeeze riveter or air motor 6 is placed between vertical sides 7—7 of the block and secured thereto by bolts 8—8 which pass through the upper portion of the vertical sides of the block and depending yoke 9 of the air motor. At the rear of the motor, and on the flat horizontal surface 10 of the block, there is a long, rectangularly-shaped frame 11 open on the side adjacent the air motor. In the upper portion of the frame index solenoid release limit switch 12 (normally closed) pivots on pin 13, extending through the switch and the sides of the frame. The index solenoid release limit switch has its actuating button 14 bearing lightly against the rear side of the air motor; the pressure of the button against the motor is controlled by leaf spring 15 and adjusting screw 16. Air-valve actuating solenoid 17 is secured to the top of the frame, and the end of thrust rod 18 of its sliding core 19 is loosely connected by pin 20 to one end of rocker arm 21 pivoting on bolt 22 attached to head 23 of the motor. The other end of the rocker arm bears against the end of air valve 24 built into the head of the motor and which protrudes through aperture 25 in the side thereof. The air valve controls the admission of air under pressure which operates well-known mechanism in the motor to reciprocate the forming punch or hammer 26 which forms the saw tooth by impact and/or squeezing action. The punch does not strike the anvil plate at the limit of its downward stroke with the saw blade absent thus preventing the reaction which would cause recycling. Coil spring 27 bears against the other end of the air valve and opposes, through the rocker arm, the action of the sliding core of the air-valve actuating solenoid. An air hose 28, for supplying air under pressure to the air motor, is attached to the top of the head of the motor by means of a coupling.

The blade-clamping mechanism indicated generally by A serves to hold the circular saw blade firmly on the anvil while the blade is being rotated and while the teeth are being set by the punch. In the clamping mechanism a circular diaphragm pressure or clamp plate 29 is held by means of threaded bolt 30 having nuts 31—31 thereon securing it to bearing 32 which pivots in the bearing hole of crosshead 33. Bolts 34—34 pass through slots 35—35, which provide adjustment, in the ends of parallel bars 36—36 and also pass through the crosshead, securing the crosshead to the parallel bars. The other ends of the bars are pivotably attached to lugs 37—37 cast on either side of the center boss 5 at the rear end of the base. A handle 38 is provided between the outer ends of parallel lever arms 39—39 which pivot on lugs 40—40 cast on either side of the base, and the other ends of the lever arms are pivotably connected to links 41—41 which are also pivotably connected to the sides of the parallel bars 36—36. A spring 42 connects brace 43 between the parallel lever arms with brace 44 between the parallel bars. The underside of the lever arms bear against pins 45—45 mounted in the sides of the parallel bars 36—36 when the clamping mechanism is lowered.

On the front side of the base there is mounted a manually-operated starting button switch 46 and a double-pole, double-throw manually-operated line switch 47. On the rear side of the base a socket 48 is provided for connection with a suitable source of electric current, for example, 440 volts, A. C.

The saw-blade indexing mechanism and its relationship with the tooth-setting means can now be readily shown by reference to Figures 2, 4, 5, 7, 8 and 9.

Figure 4:
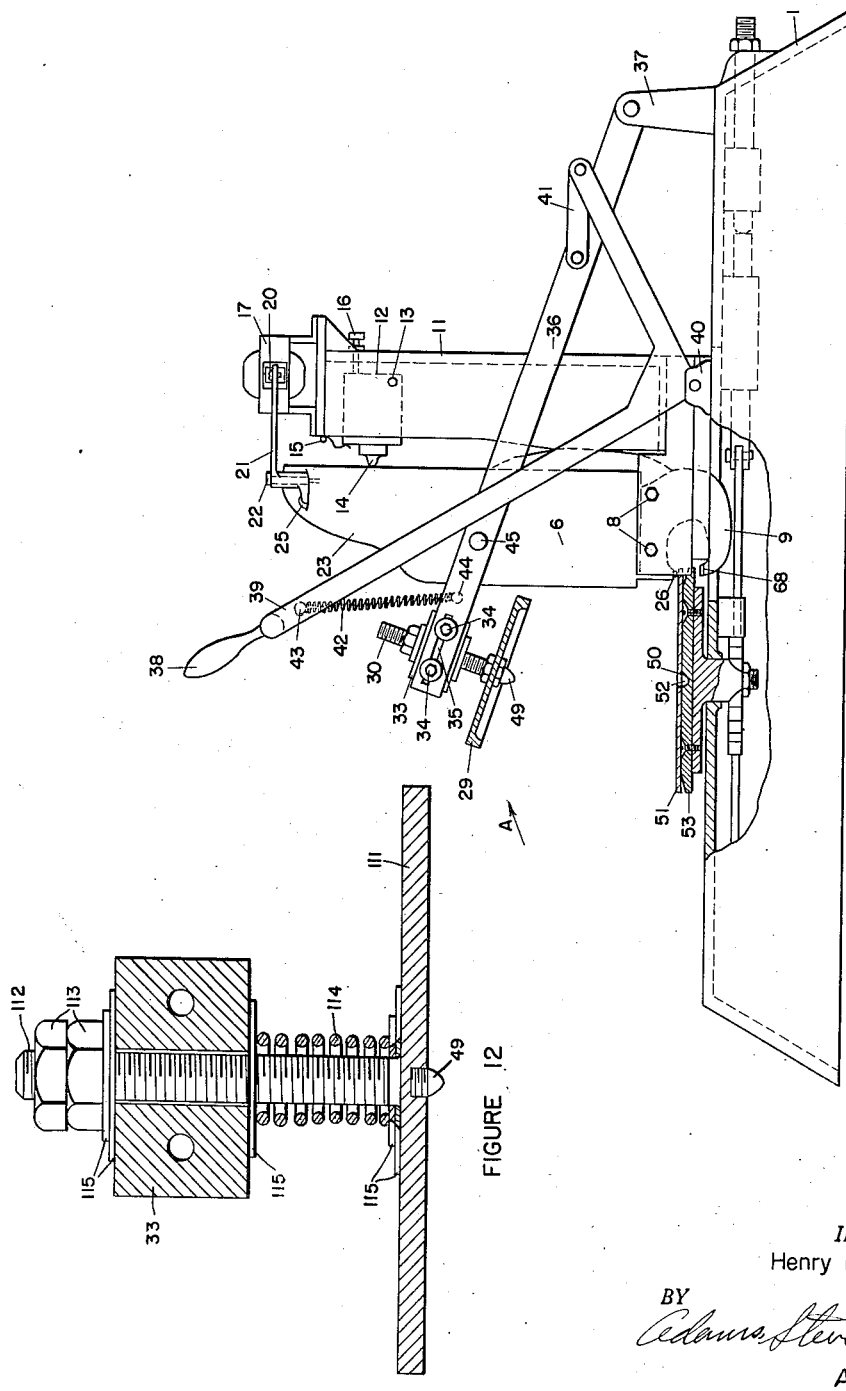
Figure 4 is a side-elevational view, partly sectional, of part of the saw-setting machine shown in Figure 1 with the blade clamp elevated and with the sides of the base broken away to show the relationship of the indexing mechanism and the setting mechanism.

In Figure 4 the blade-clamping mechanism has been raised so that the centering mandrel 49 secured to the center of the plate is clearly shown. The centering mandrel fits into the mandrel hole 50 in the center of the circular saw blade 51 and in the tapered mandrel hole 52 of the anvil plate 53 so that the saw is firmly held. As is apparent from Figure 8, pin 54 on the periphery of the anvil plate projects vertically to lie in the deep gullet 55 between the groups 56—56 of the saw-blade teeth so that the saw blade will not slip when it is rotated by the anvil plate. The pin, thus, allows reversible mounting when setting alternate teeth of the blade for single machine operation on certain types of saw blades, i. e., rip saws with deep gullets. In Figure 7, ring 57 is placed between the anvil plate and the centering mandrel in order to take up space occasioned by the use of different size mandrels for different size saw-blade mandrel holes. The anvil plate is secured to the rotating spindle flange 58 by means of machine screws 59—59 in countersunk screw holes of the anvil plate. The spindle 60, surrounded by thrust ball bearings 61—61 and sleeve bearing 62, extends through the hub 63 of the base and is tapered on its end to receive the index ratchet plate 64 which is secured thereto by means of nut 65 and key 66. The yoke 9 of the air motor extends through a generally rectangular, longitudinal slot 67 in the base in a manner such that the button 68 of the yoke is below the edge of the anvil plate. The slot is longer than the yoke of the air motor allowing the yoke to move in the slot, permitting ready adjustment of the air motor to different diameter anvil plates and circular saw blades.

Figure 5:
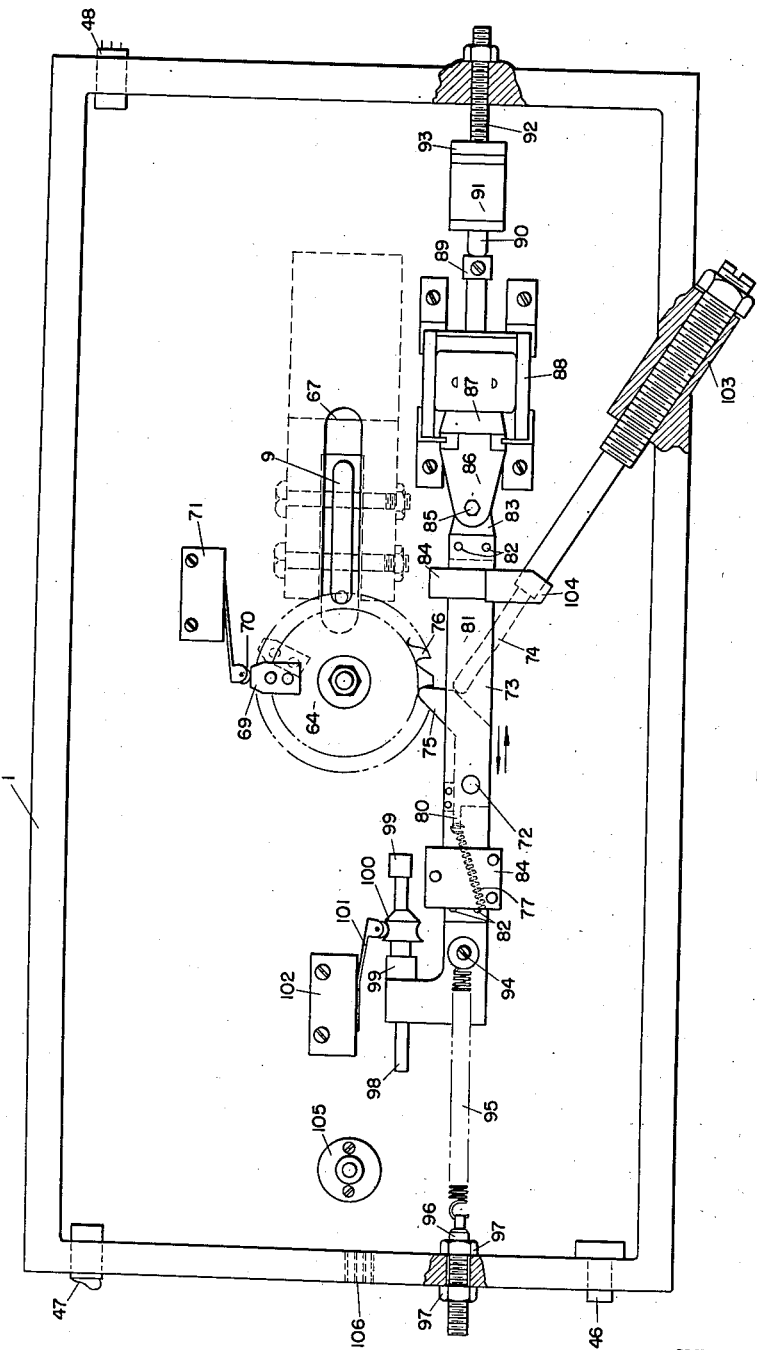
Figure 5 is a bottom view of the saw-setting machine of Figure 1, showing the arrangement of the indexing mechanism and its cooperating elements.

In Figures 5 and 9, a termination cam 69 is secured to the under edge of the index ratchet plate and with each revolution of the ratchet plate is adapted to raise and lower the follower 70 of the termination switch 71 mounted on the underside of the base. On the opposite side of the ratchet plate from the termination switch there is pivotably mounted on pivot pin 72 in the pawl holder or slide 73, and limited in its movement by the index pawl stop screw 74, an index pawl 75 which cooperates with the teeth 76 of the index ratchet plate. A light spring 77 connects the eye 78 of the L-shaped shipper rod-holder 79 with the eye 80 of the pawl to permit it to readily slip past the teeth of the ratchet plate when returned by the slide to its starting position to begin a new stroke. The ends of the flat, parallel rectangular plates 81—81 of the pawl slide, carrying the pawl, are fixably connected in spaced relationship by pins 82—82 to the link 83, and the shipper rod-holder. The pawl slide reciprocates horizontally in bearings 84—84 secured to the underside of the base 1. A pin 85 connects the link to the T-shaped end 86 of the sliding core 87 of the index solenoid 88 secured to the underside of the base. The thrust end 89 of the core bears against a button 90 on the end of the hydraulic snubber 91. A screw 92 having a flange 93 thereon projects through the side of the base and is connected to the other end of the hydraulic snubber. By means of the screw the snubber can be moved to or away from the solenoid.

On one leg of the L-shaped shipper rod-holder there is placed a screw 94 to hold one end of coil spring 95 which has its other end connected to stud 96 which passes through the base and is held in position by nuts 97—97 which can be turned to alter the tension on the coil spring. On the other leg of the shipper rod-holder there is placed a shipper rod 98 having its axis parallel to the pawl slide. On the shipper rod there are stops 99—99 and a cam 100 which is adapted to actuate the finger 101 of the air-valve solenoid-actuating switch 102 when the shipper rod is reciprocated.

The threaded end of the index pawl stop screw passes through a boss 103 in the side of the base and is held against movement by threads in the boss while the other end passes through bearing 104 near the pawl slider and bears against the side of the pawl when the pawl is at the end of its driving stroke. The index pawl stop screw is readily adjustable so that the locked position of the pawl can be varied to compensate for wear of pawl, linkage, solenoid, and index ratchet plate teeth. Thus, at the end of its driving stroke the pawl is always in the proper position. The index pawl stop screw also prevents back lash.

A pilot lamp 105 is secured to the underside of the base and when lighted is visible through apertures 106—106 in the front of the base.

In Figure 10 there is shown a catch 107 having slots 108—108 adjustably attached by screws 109—109 to the anvil, and having its pointed end 110 inserted in the gullet between the saw teeth, for the purpose of preventing the saw blade from turning on the anvil plate. It is a modified version of the pin holding means disclosed in Figure 8 and enables the maintenance of the correct relationship between the ratchet-plate teeth and the saw teeth so that the desired saw tooth will always come to rest in the proper position under the hammer. It, thus, prevents the saw blade from slipping on the anvil due to the sudden torque applied to the anvil by the index ratchet plate.

The index ratchet plate and the saw blade have a different number of teeth as can be readily seen by reference to Figure 6. Where the saw blade has 100 teeth and teeth are to be set individually, the index ratchet plate will have 50 teeth, so that when the pawl moves the ratchet plate one tooth, the blade will be automatically moved two teeth. This enables a punch having one head to set every other tooth in the saw blade. When the punch has two heads, the index ratchet plate will have 25 teeth, so that in every setting operation two alternate teeth, for examples Nos. I and III, of the saw blade A are set in one direction instead of only one tooth, No. I. A single-headed punch is used when groups have two cutting teeth as shown on blade B. Where the saw blade has 14 groups each having four cutting teeth, and a double-headed punch is used, its cooperating index ratchet plate will have 14 teeth, blades C and D. "E" is a representative ratchet plate. The proper ratchet plate must be selected for each blade so that, when the ratchet plate stops, the tooth to be set, for example No. I of blade D, will be correctly positioned under the punch of the air motor. After the tooth has been set by having the single headed punch deform it, the pawl then turns the index ratchet plate the correct amount to skip teeth II, III, IV and V of the saw blade and to stop at tooth I*a* which is then set by the action of the air motor. After tooth I*b* of the next group has been set, the pawl moves the ratchet plate and the cooperating saw blade and stops at tooth I of a new set of four teeth. After all the saw teeth having number I have been set in one direction, teeth number III are set in a like manner. The saw blade is then turned over and the process repeated until all saw teeth numbers II and IV have been set in the opposite direction. Where the capacity of the machine permits, teeth are set in multiples, thereby reducing machine and handling time. The ratchet plate is changed when the saw has a different number of groups. The punch is changed when the tooth spacing is changed, and it can have one, two, or three or more striking heads if desirable.

In Figure 12 is shown a modified clamp plate assembly. The circular flat clamp plate III has a vertically positioned threaded bolt 112 welded or otherwise secured to the center of its top side. On the underside of the plate there is placed the centering mandrel. The bolt passes loosely through the crosshead and is adjustably connected thereto by means of the nuts 113—113. Spring 114 surrounding the lower portion of the bolt provides the necessary pressure. Washers 115—115 are placed between the nuts and crosshead and the spring end and plate to provide the necessary bearing surfaces.

When operating the machine the operator selects the index ratchet plate 64 corresponding to the type of saw blade and type of punch (one or two-headed) that he is going to use and places it in the machine so that the termination cam 69 of the ratchet plate is in the position shown by the dotted lines of Fig. 5. The operator then throws line switch 47 energizing the index solenoid 88 and reciprocating the pawl slide 73 to move the ratchet plate until the termination cam contacts the follower 70 thereby opening the termination switch 71. At this moment the condition of the switches is shown by Fig. 11. In this condition the index solenoid 88 is energized, the termination switch 71 is held open by the cam 69 on the ratchet plate which prevents the air-valve solenoid 17 from energizing until the start button 46 is pushed, and the air-valve switch 102 is held closed by the shipper-rod cam 100.

A circular saw blade is placed on the anvil, the blade-clamping mechanism lowered, and the start-button switch 46 is pushed. The following sequence of actions then takes place. When the start-button is pushed, the air-valve solenoid 17 is energized. The moving core 19 of the energized air-valve solenoid 17 through the rocker arm 21 actuates the air valve 24 to admit air to the air motor 6 and thus to move the punch 26 against the saw tooth in order to set it. The air motor 6, due to the reaction from the punch 26, springs backward slightly against the button 14 of the index solenoid switch 12 to open it. The index solenoid 88 is, thus, de-energized, allowing the coil spring 95 attached to the slide 73 to retract the pawl 75 and slide assembly and its shipper rod 98. The shipper rod cam 100 then leaves its follower 101, allowing the air-valve solenoid actuating switch 102 to open. When the air-valve solenoid switch 102 opens, the air-valve solenoid 17 is de-energized, releasing force on the air-valve spring 27 in the head of the air motor. The air-valve spring 27 then, through the medium of the air-valve 24 and rocker arm 21, pushes the core 19 of the air-valve solenoid 17 to its original or retracted position. As the air valve moves to its original position, due to the action of the spring, air is released from the air motor, the punch is raised, and the air motor moves away from the button of the index solenoid switch 12, allowing it to close. On the closing of the index-solenoid switch 12, the index solenoid 88 becomes energized again, actuating the slide assembly and causing the pawl 75 to turn the index ratchet plate 64 by one tooth. At the same time the holder attached to the slide moves the cam 100 on the shipper rod 98 in contact with follower 101 thereby reclosing the air-valve solenoid switch 102 and re-energizing the air-valve solenoid 17.

The above cycle of operation is repeated until the termination cam 69 on the index ratchet plate 64 rotates through a complete cycle and contacts the follower 70 of the termination switch 71 thereby opening it. When the termination switch 71 is opened, automatic cycling ceases, the clamp plate is raised and the saw blade, now having alternate teeth set in one direction, is removed from the anvil. The blade is turned over and returned to the anvil plate. The starting button is then pushed to start the machine in order to set the remaining teeth of the blade in the opposite direction.

In production runs it may be desirable to have one person operate two machines rather than set all of the teeth of the blade by using only one machine. For example, as soon as the first saw-setting machine has set teeth Nos. I and III of each group of the saw blade in one direction, the second saw-setting machine will set teeth Nos. II and IV in the other direction.

Naturally the arrangement illustrated for the actuation of the movable members of the machine can be replaced by some other mechanical or electrical means capable of operating in the same way as illustrated herein without altering the essential features of the invention.

What is claimed is:

1. In an apparatus for setting the teeth of circular saw blades, a forming member, a rotatable, circular support for said circular saw blade having a shaped surface coincident with the teeth of the circular saw and forming an anvil for cooperation with said forming member to set the saw teeth, and means for rotating said base to bring successive preselected teeth of the saw into registry with said forming member.

2. In an apparatus for setting the teeth of circular saw blades, a punch, a circular rotatable support for said circular saw blade having a shaped surface coincident with the teeth of the circular saw and forming an anvil for cooperation with said forming member to set the saw teeth, and means for producing step-by-step movement of said support to bring successive preselected teeth into registry with said punch.

3. An apparatus for setting the teeth of circular saw blades having, in combination, a punch, a rotatable base having an annular conical surface against which preselected teeth of said saw are deformed by said punch and for supporting the circular saw blade, means for moving said base to bring successive preselected teeth into registry with said punch, and means for operating the punch coincidentally with the registry of a preselected saw tooth therewith to deform said teeth against said conical surface.

4. An apparatus for setting the teeth of circular saw blades having, in combination, a reciprocating forming member, a rotatable base having on its periphery an annular truncated conical surface against which preselected teeth of said saw blade are deformed by said member and on which said blade is supported for relative movement therewith, and automatically operating means for rotating said base to bring successive preselected teeth of said blade into registry with said member in order to set said preselected teeth.

5. In an apparatus for setting the teeth of circular saw blades, a punch, a rotatable base having coextensive therewith on its periphery an annular anvil against which preselected teeth of said saw blade are deformed by said punch and on which said blade is supported for rotative movement therewith, and automatically operating means controlled by the operation of the punch for rotating the base to bring successive preselected teeth into registry with said punch in order to set said teeth.

6. A saw-setting machine, comprising a base, a punch, means for actuating said punch, an anvil in working relationship with said punch, a ratchet fixably connected with said anvil, a pawl to engage said ratchet, and means associated with said pawl and said motor by the energizing and de-energizing of which said anvil and said punch are moved.

7. A saw-blade setting machine, comprising a base, a punch, an air motor mounted on said base for actuating said punch, a rotating anvil in working relationship with said punch, an indexing ratchet fixably connected to said anvil, a pawl for engagement with teeth of said ratchet, a reciprocating slide for pivotably holding said pawl and mechanical and electrical control and actuating means operatively connected with said holder and said motor by the intermittent energizing and de-energizing of which said anvil and said punch are caused to move.

8. A circular saw-blade setting machine, comprising a base, a punch, an air motor for operating said punch and which is slidably mounted on said base and contains an air valve, a rotating anvil in working relationship with said punch and having means to secure a saw blade thereto, an indexing ratchet plate fixably connected to and rotatable with said anvil, a reciprocating slide, a pawl in said slide to engage a tooth in said plate, and means connected to said slide and said motor by the activation and de-activation of which said anvil intermittently rotates a predetermined distance and said punch reciprocates towards said anvil.

9. A circular saw-blade setting machine, comprising a base, a punch for vertical reciprocating movement, an air motor for operating said punch and which is slidably mounted on said base and contains an air valve, a rotating anvil in working relationship with said punch and having means to prevent the slippage of a saw blade, rotating pressure means for holding a saw blade firmly on said anvil, an indexing ratchet plate having a cam and rotatable with said anvil, a reciprocating slide, a pivoted pawl in said slide for engagement with a tooth in said plate, a stop for engagement with said pivoted pawl at the end of its stroke, and cooperating electrical and mechanical control and actuating means operatively associated with said motor, said plate, and said slide by the energizing and de-energizing of which said anvil makes a complete revolution by intermittent movements at predetermined increments during which said punch vertically reciprocates.

HENRY E. HULL.

REFERENCES CITED

The following references are of record in the file of this patent:

UNITED STATES PATENTS

| Number | Name | Date |
| --- | --- | --- |
| 2,030,225 | Poeggel | Feb. 11, 1936 |